No. 746,241.

Patented December 8, 1903.

UNITED STATES PATENT OFFICE.

RALPH BAGGALEY, OF PITTSBURG, PENNSYLVANIA.

METHOD OF CONVERTING MATTE.

SPECIFICATION forming part of Letters Patent No. 746,241, dated December 8, 1903.

Application filed February 24, 1903. Renewed October 10, 1903. Serial No. 176,573. (No specimens.)

*To all whom it may concern:*

Be it known that I, RALPH BAGGALEY, of Pittsburg, in the county of Allegheny and State of Pennsylvania, have invented a new and useful Method of Converting Matte, of which the following is a full, clear, and exact description.

My invention relates to a method of supplying flux or fluxes to mattes of copper or other metals during the converting process.

In producing copper by what is known as the "Bessemer" process it is customary after the ore or concentrates have been smelted in a blast-furnace or reverberatory furnace and reduced thereby into a matte varying approximately from, say, thirty to forty per cent. up to fifty or sixty per cent. copper to transfer such matte into a converter having a lining of from eighteen to twenty-four inches in thickness of silica bonded with sufficient clay to hold the lining in place. When the air is supplied through the converting-twyers by the blast, the iron contents of the matte after being oxidized rapidly attack and destroy the silica lining, and the iron contents of the matte are thus converted into a silicate-of-iron slag, which, being less in specific gravity, floats on the top of the molten copper, gold, silver, nickel, &c., and can thus be removed. While this process of converting and purifying copper is effective and is to-day in universal use, it has been found to be very expensive and to demand that a number of converter-shells be kept on hand in order to permit of lining and converting being carried on at the same time.

In my improved process of converting copper, as described in an application filed by me on January 8, 1903, Serial No. 138,296, I use a water-jacketed converter lined with a single layer of basic or other suitable brick, and I use a larger volume of blast, and consequently a more intense heat, than it is safe or possible to use in any converter that is not protected by a water-jacket. I also use an auxiliary heat that is capable of regulation, particularly in the later stages of the converting process, in order to maintain the temperature of the molten bath to a degree that renders it impossible for the contents of the converter to chill. Without the auxiliary heat it would be impossible to carry the converting process to a successful finish in any water-jacketed converter, because when the heat of the matte would begin to fail, through the elimination of the combustible materials contained therein, or, in other words, when the matte had been purified to the extent that it contained sixty, seventy, eighty, or ninety per cent. of copper, it would solidify, and the converting process while yet incomplete would be brought to a full stop.

In my improved method I use in the converter a lining of basic or neutral material, preferably in the form of bricks, so that I do not depend on the converter-lining to supply the flux necessary to satisfy the iron or other contained bases. On the contrary, I supply the silica or other fluxes, as may be required, to the converter either before pouring the matte to be converted into the converter or after pouring the matte into the converter or during the process of converting, as may be most convenient.

My present invention consists in supplying such silica or other fluxes to the converter in a solid state and then heating or melting them by means of an auxiliary heat in the converter itself either before the matte has been poured into the converter or after the matte has been poured into the converter or during the process of converting while the solid flux is floating on top of the matte. I prefer to first place the desired flux in the converter and by means of auxiliary heat reduce it into a heated or a fused state and then pour the matte on top of such heated or fused flux. This has the effect of thoroughly mixing the two, and when the converting-twyers have been brought into action the result is very satisfactory and the elimination of the iron contained in the matte is complete.

I am aware of the fact that John Hollway in the years 1878 and 1879, in his operations in England, added silica containing aproximately four or five per cent. in iron and sometimes as much as sixteen per centum of moisture, and in this way he accomplished a separation of a portion of the contained iron, after the same had been oxidized by the blast, in the form of a silicate-of-iron slag. It has, however, not been found commercially profitable since that time to convert copper on these lines, and the art as practiced by him is totally different from my invention, which consists in heating or fusing the flux by means of an auxiliary heat in a converter having, preferably, a basic or neutral lining. In the present art of converting copper the lining alone is depended upon to supply the flux, whereas in my invention the flux is supplied to the converter in solid form and is thereafter brought to a heated or a fused condition by means of an auxiliary heat.

Those skilled in the art will be able to modify my invention without departing from the spirit of it. For instance, any desired form of converter may be used and it may contain either a basic or a silicious lining, for the fluxes may be readily reduced to a heated or a fused state in such converter even without a water-jacket without serious or material injury to the lining, providing an auxiliary heat be used, since

What I claim is—

1. The method herein described of converting mattes, which includes the step of introducing into the converter solid flux, and heating it in the converter with the aid of auxiliary heat; substantially as described.

2. The method herein described of converting mattes, which consists in introducing into the converter solid flux, heating it in the converter with auxiliary heat, and then pouring the matte on the flux; substantially as described.

3. The method herein described of converting mattes, which consists in introducing into the converter solid flux, fusing it in the converter with auxiliary heat, and then pouring the matte on the flux; substantially as described.

In testimony whereof I have hereunto set my hand.

RALPH BAGGALEY.

Witnesses:
GEO. B. BLEMING,
H. M. CORWIN.